US009875270B1

(12) United States Patent
Muniswamy Reddy et al.

(10) Patent No.: US 9,875,270 B1
(45) Date of Patent: Jan. 23, 2018

(54) LOCKING ITEM RANGES FOR CREATING A SECONDARY INDEX FROM AN ONLINE TABLE

(71) Applicant: Amazon Technologies, Inc., Seattle, WA (US)

(72) Inventors: Kiran Kumar Muniswamy Reddy, Sammamish, WA (US); Wei Xiao, Bellevue, WA (US); Pejus Manoj Das, Shoreline, WA (US); Xianglong Huang, Bellevue, WA (US); Nirmal Mehta, San Francisco, CA (US)

(73) Assignee: Amazon Technologies, Inc., Reno, NV (US)

( * ) Notice: Subject to any disclaimer, the term of this patent is extended or adjusted under 35 U.S.C. 154(b) by 298 days.

(21) Appl. No.: 14/859,053

(22) Filed: Sep. 18, 2015

(51) Int. Cl.
G06F 17/30 (2006.01)

(52) U.S. Cl.
CPC .. *G06F 17/30362* (2013.01); *G06F 17/30321* (2013.01); *G06F 17/30345* (2013.01); *G06F 17/30589* (2013.01)

(58) Field of Classification Search
CPC ............... G06F 3/064; G06F 17/30371; G06F 17/30168; G06F 17/30171
USPC ........................................................ 707/704
See application file for complete search history.

(56) References Cited

U.S. PATENT DOCUMENTS

| 7,577,658 | B2 * | 8/2009 | Graefe | ............... | G06F 17/30327 |
| 7,853,561 | B2 | 12/2010 | Holenstein et al. | | |
| 8,078,591 | B2 * | 12/2011 | Rapp | ................. | G06F 17/30362 |
| | | | | | 707/687 |
| 2003/0101183 | A1 * | 5/2003 | Kabra | ............... | G06F 17/30008 |
| 2014/0279855 | A1 | 9/2014 | Tan et al. | | |

OTHER PUBLICATIONS

U.S. Appl. No. 14/859,069, filed Sep. 18, 2015, Kiran Kumar Muniswamy Reddy et al.
"14.2.8.4 InnoDB Record, Gap, and Next-Key Locks," MySQL 5.0 Reference Manual, available at https://dev.mysql.com/doc/refman/5.0/en/innodb-record-level-locks.html, Jul. 28, 2015, published by Oracle, pp. 1-3.

\* cited by examiner

*Primary Examiner* — Hung T Vy
(74) *Attorney, Agent, or Firm* — Robert C. Kowert; Meyertons, Hood, Kivlin, Kowert & Goetzel, P.C.

(57) ABSTRACT

A data storage system may implement locking item ranges for creating a secondary index of an online table. A secondary index may be generated for a table of items stored in a non-relational data store. Different ranges of items in the data store may be locked while a corresponding portion of the secondary index is generated. Upon generating the corresponding portion of the secondary index, a range of items may be unlocked. While generating the secondary index, the table may be made available for servicing access requests. For a request to update the table received during the generation of the secondary index, a determination may be made as to whether the update is included within a locked range of the table. If locked, the request may be delayed until the range is unlocked.

20 Claims, 7 Drawing Sheets

LOCKING ITEM RANGES FOR CREATING A SECONDARY INDEX FROM AN ONLINE TABLE

BACKGROUND

Several leading technology organizations are investing in building technologies that sell "software-as-a-service". Such services provide access to shared storage (e.g., database systems) and/or computing resources to clients, or subscribers. Within multi-tier e-commerce systems, different resources may be allocated to subscribers and/or their applications from whole machines, to CPU, to memory, to network bandwidth, and to I/O capacity.

Database systems managing large amounts of data on behalf of users may receive a high volume of request traffic to access data and to manage the storage of data. Different mechanisms for structuring, arranging, or otherwise making data available may be implemented in order to service requests. Secondary indexes, for example, provide an alternative arrangement of data stored in a database system which may be accessed more efficiently for certain information requests. Data indexed in one fashion at a database may be indexed in a different fashion at a secondary index. Creating secondary indexes, however, can be challenging. Secondary index creation can be resource intensive and may create opportunities for inconsistency between data stored in the database table and the secondary index.

Figure 1:
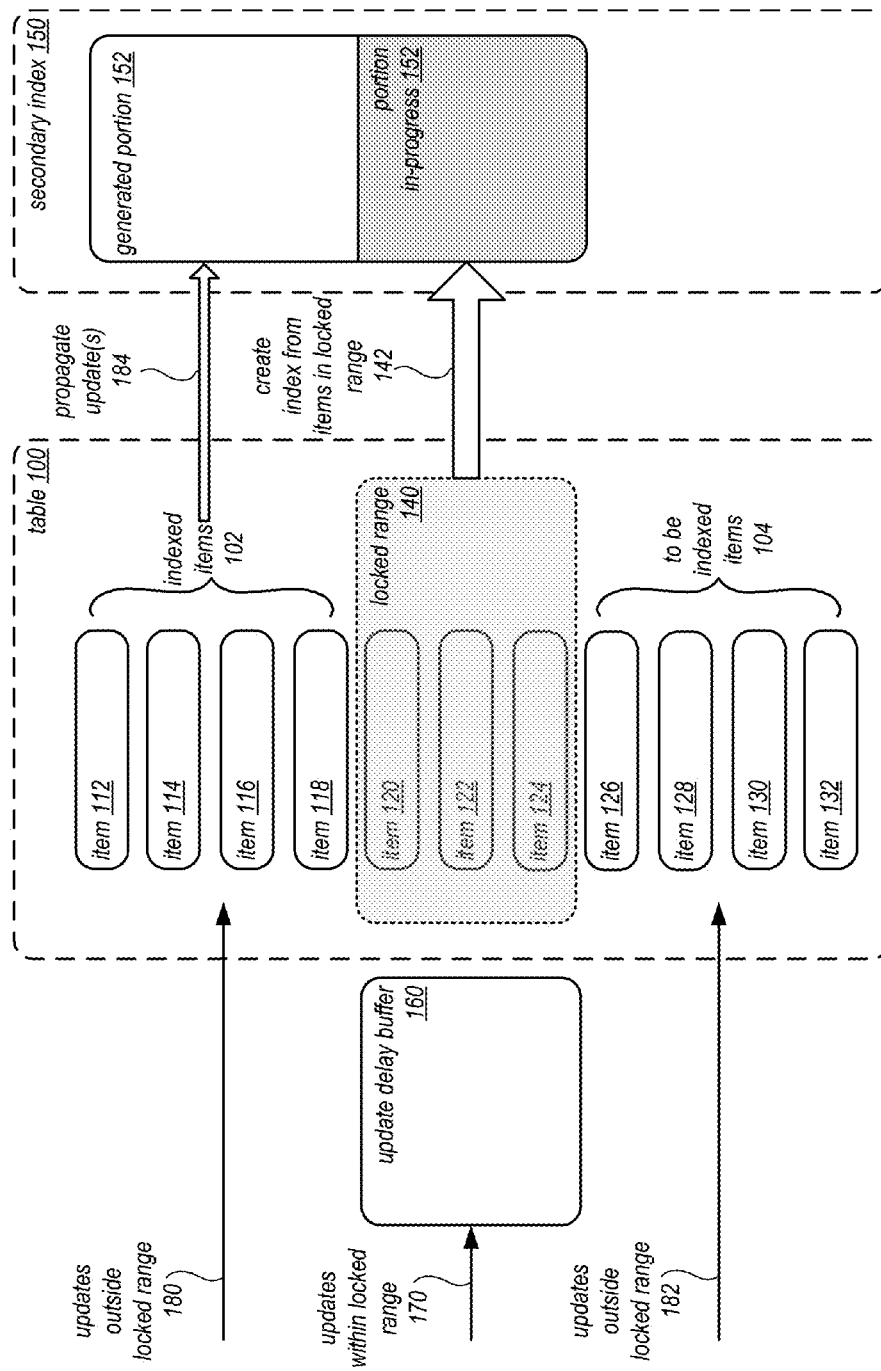
FIG. 1 is a logical block diagram illustrating locking item ranges for creating a secondary index from an online table, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be employed in various combinations and in various embodiments to implement locking item ranges for creating a secondary index from an online table. Non-relational data stores offer accessible and scalable storage to one or more multiple different clients. Tables of items (which may include one or more data values or attributes) may be stored, managed and accessed according to a key value pair which uniquely identifies an item in the table. Generally, this allows for fast throughput to update data in items or store new items. However, in some scenarios, locating items that have particular attributes may be resource intensive. For instance, identifying items with a particular attribute value that is within a range of values would likely instigate a scan of an entire table even though the range of may be only a small portion of possible values for the particular attribute or the particular attribute may not exist for some items in the table.

Secondary indexes may be created for a table in a non-relational data store in order to provide an alternative access schema for items in addition to a unique key value pair. For instance, a table that includes items for registered users may include a user identifier, which is unique and primary key for the item, along with a first name attribute, last name attribute, gender attribute, and age attribute. A secondary index may be generated for the table which can index items according to other values than the key value pair, such as gender and age. For example, the secondary index may be generated so that all items with male attribute values are stored together according to age attribute value order. Similarly, all items with female attribute values are stored together according to age attribute value order. In this way, an access request for data that specifies a particular range of ages for males or females may be quickly obtained without performing a scan of the entire table of items, as noted above. Other attribute values may also be included in the secondary index, such as first and last name attribute values. In at least some embodiments, the key value pair that uniquely identifies the item may be included in the secondary index (e.g., the user identifier). Once created, a secondary index can be updated with any changes made to the original table.

While secondary indexes can provide useful alternatives access capabilities to data, creating the secondary index may be a long running operation. However, continuing to allow access to a table for which a secondary index is being created may incur problems with maintaining consistent data between the original table and the secondary index. Locking item ranges to create a secondary index from an online table may ensure data consistency without incurring significant additional operational cost to create the secondary index.

FIG. 1 is a logical block diagram illustrating locking item ranges for creating a secondary index from an online table, according to some embodiments. Table 100 maintains items (112-132). A secondary index 150 may be created for table 100 by generating a portion of secondary index 152 from items within a locked range 140. In this way, some update requests for table 100, such as updates 180 and 182, may proceed, while only a subset of updates, such as updates 170, may be delayed.

A range of items 140 may be locked for generating a portion of secondary index 150. The range of items may be identified by range identifiers, which may be one or more attribute values that indicate a subset of possible attribute values for items which may be indexed. For example, locked range 140 may have alphabetic range identifiers "H" to "M" so that items with a particular attribute value that is being indexed (e.g., a last name value) may be evaluated that are within that range. For instance, item 120 may have a last name attribute value of "Hall", item 122 a value of "Nye" and item 122 a value of "Madison." Thus each of these attribute values is within the locked range. For updates received at table 100 to one of items 120-124 (e.g., to add, remove or change data), the updates may be determined to be updates within the locked range of items 170. Such updates may be delayed, storing the update requests in update delay buffer 160, until the locked range 140 is unlocked, after which the updates may be performed. Updates to add new items, such as an update to add an item with a last name attribute value of "Lawson" may also be delayed (e.g., stored in update delay buffer 160). In this way, when creating the index from items in the locked range 142, no stale or otherwise inconsistent data may be stored to the in progress portion 152 of secondary index. For those updates 180 and 182 that are determined to be outside of locked range 140 (e.g., updates to items 112-118 or items 126-132), the updates may be performed at table 100.

Ranges of items may be incrementally locked, in some embodiments. For instance, prior to locking range 140, a range of items 116 to 118 may have been locked. Once the secondary index portion is created from items 116 and 118, the locked range may change to locked range 140, and so on. In at least some embodiments, updates 180 to indexed items 102 may also be propagated 184 to generated portion 152 of secondary index 150 if appropriate (e.g., the updates are to attribute values included in the secondary index). For updates 182 to items to be indexed 104, updates may only be applied to table 100, as the items may be subsequently included in a locked range for generating the secondary index 150. In at least some embodiments, other secondary index(es) may be maintained for table 100. Therefore, updates 182 to items to be indexed 104 may be propagated to those other secondary index(es) if appropriate.

Please note that previous descriptions are not intended to be limiting, but are merely provided as logical examples of locking item ranges to create a secondary index from an online table.

This specification begins with a general description of storage service implementing a network-based data store that may also lock item ranges to create a secondary index from an online table. Then various examples of the storage service are discussed, including different components/modules, or arrangements of components/module, that may be employed as part of implementing the storage service. A number of different methods and techniques to implement locking item ranges to create a secondary index from an online table are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
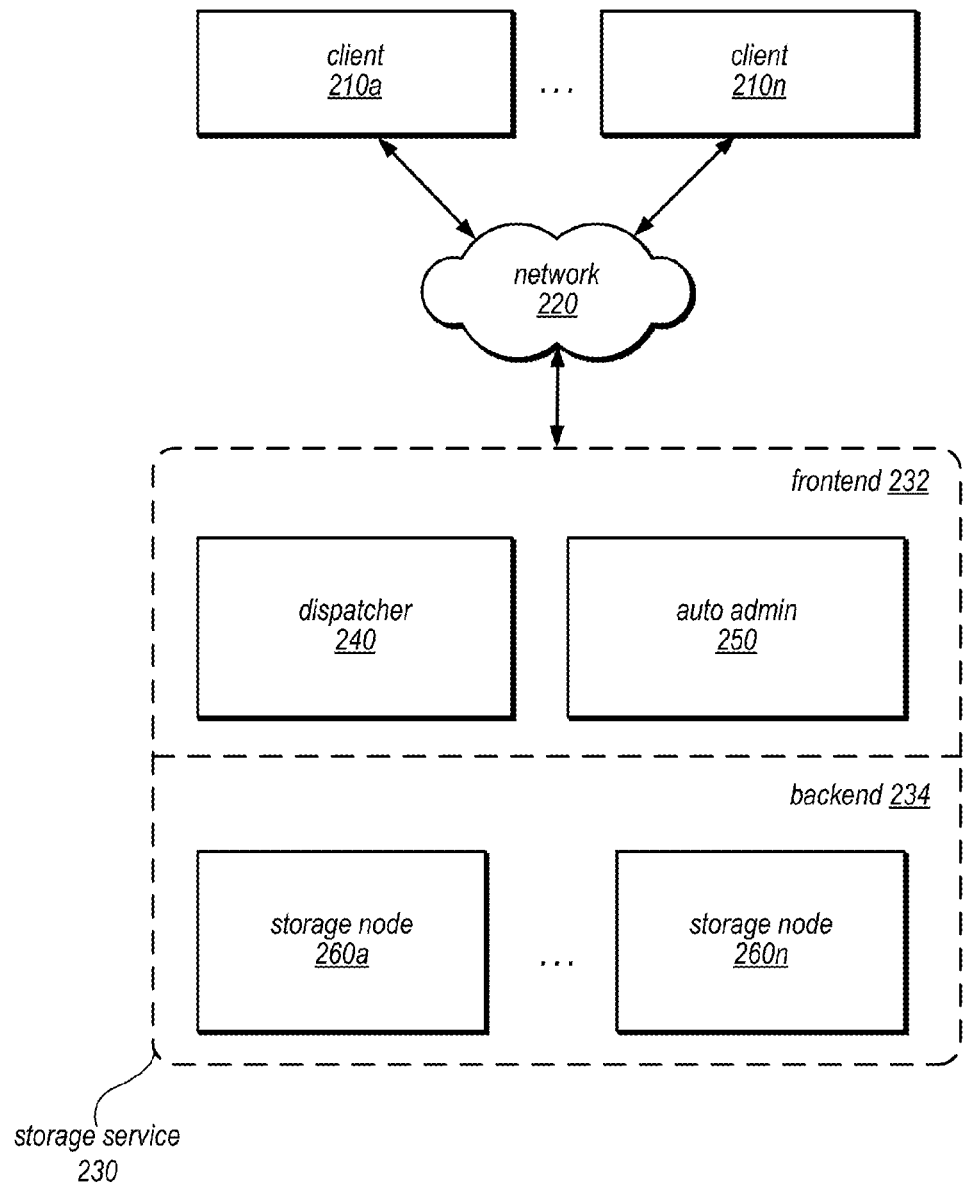
FIG. 2 is a block diagram illustrating a storage service that implements locking item ranges for creating a secondary index from an online table, according to some embodiments.

FIG. 2 is a block diagram illustrating a storage service that implements locking item ranges for creating a secondary index from an online table, according to some embodiments. It is noted that where one or more instances of a given component may exist, reference to that component herein below may be made in either the singular or the plural. However, usage of either form is not intended to preclude the other. In various embodiments, the components illustrated in FIGS. 2-4 may be implemented directly within computer hardware, as instructions directly or indirectly executable by computer hardware (e.g., a microprocessor or computer system), or using a combination of these techniques. For example, the components of FIG. 2 may be implemented by a distributed system including a number of computing nodes (or simply, nodes), such as computing system 1000 in FIG. 7 described below. In various embodiments, the functionality of a given storage service system component may be implemented by a particular computing node or may be distributed across several computing nodes. In some embodiments, a given computing node may implement the functionality of more than one storage service system component.

Generally speaking, clients 210a-210n may encompass any type of client configurable to submit web services requests to network-based storage service 230 via network 220. For example, a given storage service client 210 may include a suitable version of a web browser, or a plug-in module or other type of code module configured to execute as an extension to or within an execution environment provided by a web browser to provide database or data storage service clients (e.g., client applications, users, and/or subscribers) access to the services provided by network-based services platform 230. Alternatively, a storage service client 210 may encompass an application such as a database application, media application, office application or any other application that may make use of persistent storage resources. In some embodiments, such an application may include sufficient protocol support (e.g., for a suitable version of Hypertext Transfer Protocol (HTTP)) for generating and processing web services requests without necessarily implementing full browser support for all types of web-based data. That is, storage service client 210 may be an application configured to interact directly with network-based storage service 230. In various embodiments, storage service client 210 may be configured to generate web services requests according to a Representational State Transfer (REST)-style web services architecture, a document- or message-based web services architecture, or another suitable web services architecture.

In some embodiments, storage service client 210 may be configured to provide access to network-based storage service 230 to other applications in a manner that is transparent to those applications. For example, storage service client 210 may be configured to integrate with an operating system or file system to provide storage in accordance with a suitable variant of the storage model described herein. However, the operating system or file system may present a different storage interface to applications, such as a conventional file system hierarchy of files, directories and/or folders. In such an embodiment, applications may not need to be modified to make use of the storage system service model described herein. Instead, the details of interfacing to network-based storage service 230 may be coordinated by storage service client 210 and the operating system or file system on behalf of applications executing within the operating system environment.

Storage service clients 210 may convey web services requests to and receive responses from network-based storage service 230 via network 220. In various embodiments, network 220 may encompass any suitable combination of networking hardware and protocols necessary to establish web-based communications between clients 210 and network-based storage service 230. For example, network 220 may generally encompass the various telecommunications networks and service providers that collectively implement the Internet. Network 220 may also include private networks such as local area networks (LANs) or wide area networks (WANs) as well as public or private wireless networks. For example, both a given client 210 and network-based storage service 230 may be respectively provisioned within enterprises having their own internal networks. In such an embodiment, network 220 may include the hardware (e.g., modems, routers, switches, load balancers, proxy servers, etc.) and software (e.g., protocol stacks, accounting software, firewall/security software, etc.) necessary to establish a networking link between given client 210 and the Internet as well as between the Internet and network-based storage service 230. It is noted that in some embodiments, storage service clients 210 may communicate with network-based storage service 230 using a private network rather than the public Internet. For example, clients 210 may be provisioned within the same enterprise as the data storage service (and/or the underlying system) described herein. In such a case, clients 210 may communicate with network-based storage service 230 entirely through a private network 220 (e.g., a LAN or WAN that may use Internet-based communication protocols but which is not publicly accessible).

Generally speaking, network-based storage service 230 may be configured to implement one or more service endpoints configured to receive and process web services requests, such as requests to access tables maintained on behalf of clients/users by a database service or a data storage service, and/or the items and attributes stored in those tables. For example, network-based storage service 230 may include hardware and/or software configured to implement various service endpoints and to properly receive and process HTTP-based web services requests directed to those endpoints. In one embodiment, network-based storage service 230 may be implemented as a server system configured to receive web services requests from clients 210 and to forward them to various components that collectively implement a data storage system for processing. In other embodiments, network-based storage service 230 may be configured as a number of distinct systems (e.g., in a cluster topology) implementing load balancing and other request management features configured to dynamically manage large-scale web services request processing loads.

As illustrated in FIG. 3, network-based storage service 330 may include a dispatcher 340 (which may be configured to receive, authenticate, parse, throttle and/or dispatch service requests, among other things), one or more administrative components, or auto admin instances, 350 (which may be configured to provide a variety of visibility and/or control functions, as described in more detail herein) which may be implemented as part of frontend 232. Storage service 230 may also implement a plurality of storage node instances (shown as 360a-360n), each of which may maintain and manage one or more tables on behalf of clients/users or on behalf of the data storage service (and its underlying system) itself, as part of backend 234. Some of the functionality provided by each of these types of components is described in more detail herein, according to various embodiments. Note that in some embodiments, network-based storage service 330 may include different versions of some of the components illustrated in FIG. 3 to provide functionality for creating, accessing, and/or managing tables maintained in database instances within a single-tenant environment than those that provide functionality for creating, accessing, and/or managing tables maintained in database instances within a multi-tenant environment. In other embodiments, functionality to support both multi-tenant and single-tenant environments may be included in any or all of the components illustrated in FIG. 2. Note also that in various embodiments, one or more database instances may be implemented on each of the storage nodes 360a-360n, and each may store tables on behalf of clients. Some of these database instances may operate as if they were in a multi-tenant environment, and others may operate as if they were in a single-tenant environment. In some embodiments, database instances that operate as in a multi-tenant environment may be implemented on different computing nodes (or on different virtual machines executing on a single computing node) than database instances that operate as in a single-tenant environment.

In various embodiments, network-based storage service 230 may be configured to support different types of web services requests. For example, in some embodiments, network-based storage service 230 may be configured to implement a particular web services application programming interface (API) that supports a variety of operations on tables (or other data objects) that are maintained and managed on behalf of clients/users by the data storage service system (and/or data stored in those tables). Examples of the operations supported by such an API are described in more detail herein.

In addition to functioning as an addressable endpoint for clients' web services requests, in some embodiments network-based storage service 230 may implement various client management features. For example, service 230 may coordinate the metering and accounting of client usage of web services, including storage resources, such as by tracking the identities of requesting clients 210, the number and/or frequency of client requests, the size of tables and/or items stored or retrieved on behalf of clients 210, overall storage bandwidth used by clients 210, class of storage requested by clients 210, and/or any other measurable client usage parameter. Network-based storage service 230 may also implement financial accounting and billing systems, or may maintain a database of usage data that may be queried and processed by external systems for reporting and billing of client usage activity. In some embodiments, network-based storage service 230 may include a lock manager and/or a bootstrap configuration (not shown).

In various embodiments, the data storage service described herein may provide an application programming interface (API) that includes support for some or all of the following operations on the data in a table maintained by the service on behalf of a storage service client: put (or store) an item, get (or retrieve) one or more items having a specified primary key, delete an item, update the attributes in a single item, query for items using an index, scan (e.g., list items) over the whole table, optionally filtering the items returned, and create one or more secondary indexes global to the whole table which may be used to perform different queries efficiently over particular attributes in the table that are used to create the secondary index. The amount of work required to satisfy service requests that specify these operations may vary depending on the particular operation specified and/or the amount of data that is accessed and/or transferred between the storage system and the client in order to satisfy the request. Thus, storage service 230 may identify some requests for synchronous processing while other requests may be identified for asynchronous processing.

In some embodiments, the service (and/or the underlying system that implements the service) may support a strong consistency model, in addition to supporting eventually consistent read operations. In some embodiments, service requests made via the API may include an indication of one or more user preferences, such as a preferred consistency model, a preferred service request throughput level, or a service request throughput level for which a guarantee is requested. In other embodiments, some or all of these user preferences may be specified when a table is created, or may be client-specific, account-specific, specific to various table types, or specified by system-wide default values, rather than being specified on a per-request basis. The API may support extreme scaling and/or more predictable performance than that provided by prior data storage systems and services.

In some embodiments, a partition replica may be assigned to a particular storage node based largely (or solely) on whether there is enough storage capacity for the anticipated size of the table. For example, the anticipated size may be based on information included in a request to create the table, on usage history for the client on whose behalf the table was created, or on a history of accesses that target the table, the partition, or the replica itself (e.g., if this is a partition replica that is being reassigned as part of a move operation). In such embodiments, there may or may not be enough throughput capacity for the partition replica on the selected storage node (or storage device thereof). For example, a disk to which the partition replica is assigned may be oversubscribed in terms of IOPS, the actual number of IOPS may be more than was expected, or the provisioned (or committed) number of IOPS may have grown after the partition replica was created (e.g., using an UpdateTable operation to increase the provisioned throughput capacity for read operations and/or write operations). In some embodiments, an UpdateTable operation may be invoked by a client through a graphical user interface (GUI). In other embodiments, an UpdateTable operation may be invoked through an UpdateTable API whose inputs include an identifier of the table for which additional throughput capacity is desired, a desired (e.g., increased) number of IOPS for read operations and/or a desired (e.g., increased) number of IOPS for write operations. In some or all of these cases, the partition replica may need to be moved to another storage node (or storage device) or split into two new (smaller) partitions, each of which may be hosted on a different storage device (or storage node).

In various embodiments, a database service or data storage service may be implemented on one or more computing nodes that are configured to perform the functionality described herein. In some embodiments, the service may be implemented by a network-based storage service (such as network-based storage service 230 in FIG. 2) that is made up of multiple computing nodes, each of which may perform one or more of the functions described herein. Various collections of the computing nodes may be configured to provide the functionality of an auto-admin cluster, a cluster of resources dedicated to the data storage service, and a collection of external resources (which may be shared with other network-based services or applications, in some embodiments).

In some embodiments, the database systems described herein may support seamless scaling of user tables in a "fully shared nothing" type architecture. For example, in some embodiments, each database partition may be implemented as a completely independent parallel computation unit. In such embodiments, the system may not provide distributed coordination across partitions or support batch "put" operations and/or multi-statement transactions. In some embodiments, as long as the workload distribution is well spread across partitions, an increase in the number of partitions may result in a larger usable table size and/or increased throughput capacity for service requests. As described herein, in some embodiments, live repartitioning (whether programmatic/automatic or explicitly initiated) may be employed to adapt to workload changes. In other words, in some embodiments, repartitioning (including partition moving, partition splitting, and/or other partition management operations) may be performed while service requests directed to the affected partitions continue to be received and processed (i.e. without taking the source partition off-line).

In some embodiments, a service (and/or underlying system) may support a variety of service offerings and/or throughput models. In some embodiments, the service may support a committed work throughput offering and/or a best effort offering. In some embodiments, a committed work throughput level may be specified in terms of a measure of normalized, logical work units (or logical service request units) over time, and may represent a work throughput level that is guaranteed by the system. For example, in systems that provide database or data storage services (e.g., in tables maintained on behalf of clients), a storage service client (e.g., a client application, user, or subscriber having access to the service) may specify a preference between multiple throughput options that are offered by the service, according to a variety of business models, subscription types, and/or payment models. For example, the client/user may indicate a preferred throughput model for a particular table through a parameter of a request to create the table, in some embodiments. In other embodiments, a client/user may specify a default throughput model for all tables created and maintained on their behalf by the data storage service. By supporting both a committed throughput model and a best effort throughput model (for which no throughput guarantees are made), the system may allow clients/users to make a trade-off between performance and cost, according to their needs and/or budgets. Other types of services may support a committed work throughput model and/or other throughput models.

A storage service (and underlying system) that provides a committed throughput offering may be configured to pre-allocate capacity and/or resources for the creation, growth, and management of a table maintained on behalf of a client/user in response to traffic directed to the table, and not to overbook the resources and/or capacity of the storage node(s) on which that table is maintained. In some embodiments, tables maintained by the service (and underlying system) under a committed throughput model may be maintained in faster (and often more expensive) storage resources, such as high performance media (e.g., flash memory or Solid State Drive, or SSD, media), in order to provide extremely low latencies when servicing requests from the client/user. For example, the system may provide (and dedicate) a high ratio of fast/local memory to main (e.g., disk) memory for the maintenance of those tables (and various partitions thereof). While the storage resources allocated to a given table under a committed throughput model may in some cases be underutilized (at least some of the time), the client/user may value the predictable performance afforded by the committed throughput model more than the additional (and in some cases wasted) costs of dedicating more resources than may always be necessary for that table. Similarly, resources that are pre-allocated to other types of services to support a committed work throughput model may in some cases be underutilized (at least some of the time), but may provide the client/user with a predictable level of performance (e.g., in terms of availability and/or responsiveness).

As described herein, in some embodiments the systems described herein may support both a multi-tenant model and a single-tenant model. In such some embodiments, the client/user may indicate a preferred one of these tenancy models for a particular table through a parameter of a request to create the table. In other embodiments, a client/user may specify a default or initial tenancy model for all tables created and maintained on their behalf by the data storage service.

Figure 3A:
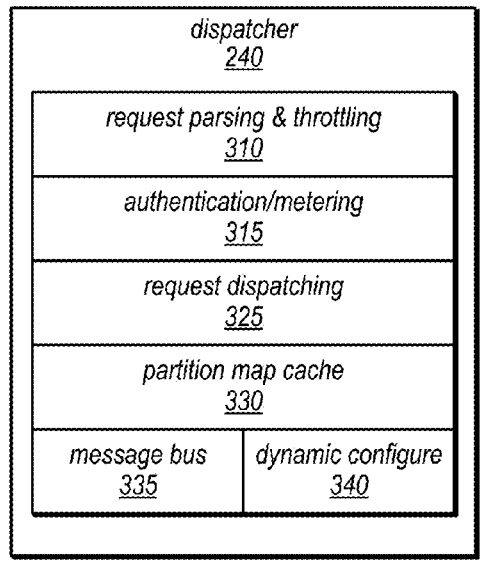
FIGS. 3A-3C are block diagrams illustrating various components of a storage service, according to some embodiments.
Figure 3B:
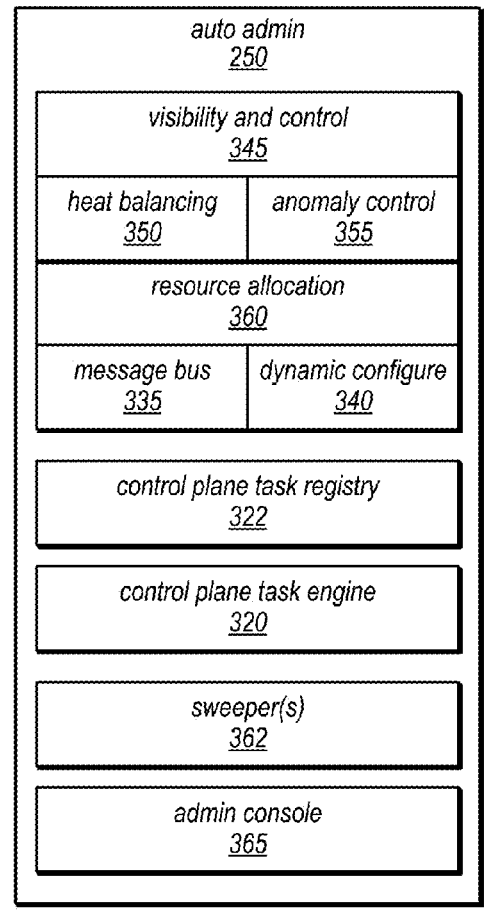
Figure 3C:
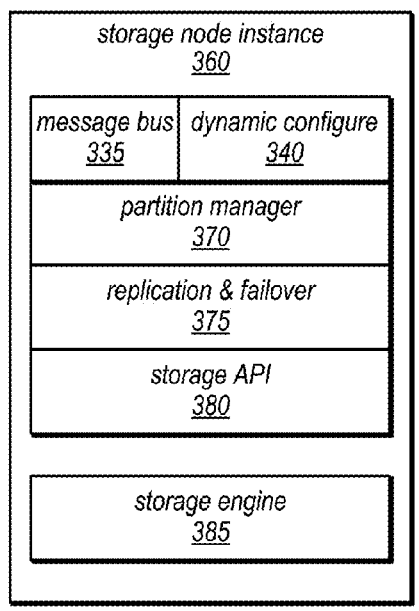

FIGS. 3A-3C illustrate various elements or modules that may be included in each of the types of components of network-based storage service 230, according to one embodiment. As illustrated in FIG. 3A, dispatcher 240 may include one or more modules configured to perform parsing and/or throttling of service requests (shown as 310), authentication and/or metering of service requests (shown as 315), dispatching service requests (shown as 325), and/or maintaining a partition map cache (shown as 330). In addition to these component-specific modules, dispatcher 240 may include components that are common to multiple types of computing nodes that collectively implement Web services platform 330, such as a message bus (shown as 335) and/or a dynamic configuration module (shown as 340). In other embodiments, more, fewer, or different elements may be included in dispatcher 240, or any of the elements illustrated as being included in dispatcher 240 may be included in another component of network-based storage service 230 or in a component configured to interact with network-based storage service 230 to provide the data storage services described herein.

As illustrated in FIG. 3B, auto admin instance 250 may include one or more modules configured to provide visibility and control to system administrators (shown as 345), or to perform heat balancing (shown as 350), and/or anomaly control (shown as 355), resource allocation (shown as 360). In some embodiments, resource allocation module 360, heat balancing module 350, anomaly control module 355, control plane event registry 322, control plane task engine 320, and/or sweeper module(s) 362, may be configured to work separately or in combination to perform identifying requests for asynchronous processing and performing asynchronous processing of requests, as described in more detail below. Auto admin instance 250 may also include an admin console 365, through which system administrators may interact with the data storage service (and/or the underlying system). In some embodiments, admin console 365 may be the primary point of visibility and control for the data storage service (e.g., for configuration or reconfiguration by system administrators). For example, admin console 365 may be implemented as a relatively thin client that provides display and control functionally to system administrators and/or other privileged users, and through which system status indicators, metadata, and/or operating parameters may be observed and/or updated.

Auto admin instance 250 may include, in some embodiments control plane task registry 322. Control plane task registry 322 may provide an interface or access to information stored about one or more detected control plane events, such as requests to be processed, at storage service 230. In at least some embodiments, control plane task registry 322 may be implemented to interface with a table or data object that can be changed, updated or written to by other modules of auto admin instance 250, such as sweeper modules 362 or control plane task engine 320. For example, in some embodiments control plane event data may be stored on a database table that is accessible via control plane task registry 322. In at least some embodiments, other service systems, nodes, devices, instances, etc. may send registration messages for detected control plane events, updates, or some other form of request to auto admin instance 250 for storage in task registry 322.

Control plane event registration messages may, in various embodiments, include information about the detected control plane event. For example, control plane event messages may include the event trigger, such as a particular client or module (e.g., sweeper module). Information about the one or more control plane operations to be performed in response to the control plane event, such as the request type or the resources to be utilized (e.g., storage nodes) may be included.

Auto admin instance 250 may also include control plane task engine 320. As noted above, in some embodiments, multiple instances of auto-admin 250 may be implemented with one instance performing the control plane task engine function, and other deputy instances implementing the sweeper(s). However, in some embodiments a single auto-admin instance may be configured to perform both task scheduling and implement the tasks handlers to perform the scheduled control plane event operations.

Control plane task engine 320 may be configured to direct the performance of different types of control plane operations among the nodes, systems, or devices implementing network-based storage service 230. For instance, task engine 320 may be configured to communicate with master nodes of clusters of storage nodes to initiate the performance of various control plane operations, such as moves, splits, update tables, delete tables, create indexes, etc. . . . Task engine 320 may also be configured to update task registry 322 (or some other table or data structure) with the status, state, or performance information of the tasks currently being performed. For example, for each child operation or subtask of a control plane operation, an update may be sent to update a respective entry in the record of the detected event to which the operation corresponds. Control plane task engine 320 may also provide updates indicating the resources that are currently utilized to perform the control plane operation, such as the particular replica, data, node, system, or device.

In various embodiments, control plane task engine 320 may be configured to perform an update table operation type. An update table operation may change or modify a performance attribute or value for the maintained table. For instance, in some embodiments, tables may have a provisioned throughput performance (e.g., a certain number of IOPS). An update table operation may change the provisioned throughput performance of the table to a different throughput performance. An update table operation may perform various sub-tasks or child operations. Upon completion or initiation of these or various other steps for performing an update table operation, task handler 150 may be configured to send/write updates to control plane event registry 120 for the detected event. An update table event may be triggered externally, for example by a client API request. In at least some embodiments, an update table API request may be identified for asynchronous processing. Alternatively, one or more internal maintenance operations, such as sweeper modules 362 may trigger an update table operation.

In various embodiments, control plane task engine may be configured to perform a secondary index creation operation in response to a client API request. For instance, in some embodiments, attributes of table may be identified for the creation of a new index for the table. Control plane task engine 320 may identify new storage node instance(s) 360 to host the index and direct storage node instance(s) 360 in the performance of scanning, building, and copying of the index to the new storage nodes instance(s) 360. In at least some embodiments, a create secondary index API request may be identified for asynchronous processing.

In addition to these component-specific modules, auto admin instance 250 may also include components that are common to the different types of computing nodes that collectively network-based storage service 230, such as a message bus (shown as 335) and/or a dynamic configuration module (shown as 340). In other embodiments, more, fewer, or different elements may be included in auto admin instance 250, or any of the elements illustrated as being included in auto admin instance 250 may be included in another component of network-based storage service 230 or in a component configured to interact with network-based storage service 230 to provide the data storage services described herein.

As illustrated in FIG. 3C, storage node instance 360 may include one or more modules configured to provide partition management (shown as 370), to implement replication and failover processes (shown as 375), and/or to provide an application programming interface (API) to underlying storage (shown as 380 Various different ones of the control plane operations described above may be performed locally (e.g., on a given storage node instance 360) based, e.g., on one or more measures of the utilization of provisioned resources on the storage devices or logical storage volumes of the storage node instance.

As noted above, different storage nodes may be implementing or maintaining resources in multiple different arrangements, some of which may be part of larger collections or groups of resources. A replica group, for example, may be composed of a number of storage nodes maintaining a replica of particular portion of data (e.g., a partition of a table) for the storage service. Moreover, different replica groups may utilize overlapping nodes, where a storage node may be a member of multiple replica groups, maintaining replicas for each of those groups whose other storage node members differ from the other replica groups. Thus if, for example replica group 1 has storage nodes A, B, and C, replica group 2 may have storage nodes B, D, and E. Besides differing groups of storage nodes, in various embodiments, storage nodes may have different relationships to other storage nodes. Continuing with the above example, for replica group 1, storage node A may be a master node, performing special functions with regard to access requests directed toward the partition maintained by replica group 1. For replica group 2, however, storage node B may be the master node. Therefore, a storage node's relationship to other storage nodes may be different depending on the particular grouping evaluated. These various examples of different arrangements of resources among storage nodes highlight the various different ways that control plane operations may interact with resources that are not solely devoted to one particular (though they may be) function, data replica, etc.

As illustrated in this example, each storage node instance 360 may include a storage engine 385, which may be configured to maintain (i.e. to store and manage) one or more tables (and associated table data) in storage 380 (which in some embodiments may be a non-relational database) on behalf of one or more clients/users. In addition to these component-specific modules, storage node instance 360 may include components that are common to the different types of computing nodes that collectively implement Network-based storage service 230, such as a message bus (shown as 335) and/or a dynamic configuration module (shown as 340). In other embodiments, more, fewer, or different elements may be included in storage node instance 360, or any of the elements illustrated as being included in storage node instance 360 may be included in another component of network-based storage service 230 or in a component configured to interact with network-based storage service 230 to provide the data storage services described herein.

Note that in some embodiments, it may not be necessary to perform some or all of the throttling, authentication, and/or metering operations that would typically be provided by dispatcher 240 in multi-tenant environments for tables operating in a single-tenant environment. For example, the system may be configured to elide these operations when servicing requests directed to tables in a single-tenant environment, but to perform them when servicing requests directed to tables in a multi-tenant environment. Similarly, in some embodiments, some of the operations illustrated as being performed by auto admin instance 250 (e.g., heat balancing and/or resource allocation) may or may not be applied in managing tables in a single-tenant environment. However, other operations illustrated as being performed by auto admin instance 250 (or various modules thereof) may be applied in the creation and/or management of tables in both multi-tenant and single-tenant environments.

The systems underlying the data storage service described herein may store data on behalf of storage service clients (e.g., client applications, users, and/or subscribers) in tables containing items that have one or more attributes. In some embodiments, the data storage service may present clients/users with a data model in which each table maintained on behalf of a client/user contains one or more items, and each item includes a collection of attributes. The attributes of an item may be a collection of name-value pairs, in any order. In some embodiments, each attribute in an item may have a name, a type, and a value. Some attributes may be single valued, such that the attribute name is mapped to a single value, while others may be multi-value, such that the attribute name is mapped to two or more values. In some embodiments, the name of an attribute may always be a string, but its value may be a string, number, string set, or number set. The following are all examples of attributes: "ImageID"=1, "Title"="flower", "Tags"={"flower", "jasmine", "white"}, "Ratings"={3, 4, 2}. The items may be managed by assigning each item a primary key value (which may include one or more attribute values), and this primary key value may also be used to uniquely identify the item. In some embodiments, a large number of attributes may be defined across the items in a table, but each item may contain a sparse set of these attributes (with the particular attributes specified for one item being unrelated to the attributes of another item in the same table), and all of the attributes may be optional except for the primary key attribute(s). In other words, unlike in traditional databases, the tables maintained by the data storage service (and the underlying storage system) may have no pre-defined schema other than their reliance on the primary key. Note that in some embodiments, if an attribute is included in an item, its value cannot be null or empty (e.g., attribute names and values cannot be empty strings), and, and within a single item, the names of its attributes may be unique. However, in at least some other embodiments, traditional database schemes may be employed, such as the various types of relational databases implemented using Server Query Language (SQL).

In various embodiments, the service (and/or the underlying system) may enforce pre-determined size limits on table names, items, attribute values, primary key values, and/or attribute names. For example, in some embodiments, the total size of all the attribute names and values in an item (i.e. the row size) may be limited. These attributes may also be described by system resource metadata and anomalies between these attributes and system resource metadata may be detected.

The database and data storage services described herein (and/or the underlying system) may provide an application programming interface (API) for requesting various operations targeting tables, items, and/or attributes maintained on behalf of storage service clients. In some embodiments, the service (and/or the underlying system) may provide both control plane APIs and data plane APIs. The control plane APIs provided by the data storage service (and/or the underlying system) may be used to manipulate table-level entities, such as tables and indexes and/or to re-configure various tables These APIs may be called relatively infrequently (when compared to data plane APIs). In some embodiments, the control plane APIs provided by the service may be used to create tables, import tables, export tables, delete tables, explore tables (e.g., to generate various performance reports or skew reports), modify table configurations or operating parameter for tables (e.g., by modifying the amount of throughput capacity, adding storage capacity for additional read replicas, splitting partitions or moving partitions), and/or describe tables. In some embodiments, control plane APIs that perform updates to table-level entries may invoke asynchronous workflows to perform a requested operation. Methods that request "description" information (e.g., via a describeTables API) may simply return the current known state of the tables maintained by the service on behalf of a client/user. The data plane APIs provided by the data storage service (and/or the underlying system) may be used to perform item-level operations, such as storing, deleting, retrieving, and/or updating items and/or their attributes, or performing index-based search-type operations across multiple items in a table, such as queries and scans.

The APIs provided by the service described herein may support request and response parameters encoded in one or more industry-standard or proprietary data exchange formats, in different embodiments. For example, in various embodiments, requests and responses may adhere to a human-readable (e.g., text-based) data interchange standard, (e.g., JavaScript Object Notation, or JSON), or may be represented using a binary encoding (which, in some cases, may be more compact than a text-based representation). In various embodiments, the system may supply default values (e.g., system-wide, user-specific, or account-specific default values) for one or more of the input parameters of the APIs described herein.

As noted above, the control plane APIs supported by the service may include APIs that perform updates on tables (e.g., a CreateTable API and/or a DeleteTable API). In various embodiments, these APIs may invoke asynchronous workflows to perform the requested operation. In addition, the service may support methods that return the current known state (e.g., a DescribeTables API) or that return various skew metrics or reports (e.g., an ExploreTable API). In some embodiments, a common use model may be for a client to request an action (e.g., using a CreateTable API), and then to poll on its completion via the corresponding description API (e.g., DescribeTables). Other supported methods may be used to modify table configurations or parameters, e.g., an UpdateTable API (which may be used to increase the provisioned throughput capacity for a given table or create a secondary index for the table), a PurchaseTableCapacity API (which may be used to increase the provisioned storage capacity for a given table), a SplitTable API (which may be used to explicitly invoke an operation to split a table or any of its partitions), or a MoveTable API (which may be used to explicitly invoke an operation to move one or more tables, partitions of a table, or partition replicas of a table).

In some embodiments in which the system provides database or data storage services to clients, the system may provide an application programming interface (API) that includes support for some or all of the following operations on data maintained in a table by the service on behalf of a storage service client: put (or store) an item, get (or retrieve) one or more items having a specified primary key, delete an item, update the attributes in a single item, query for items using an index, and scan (e.g., list items) over the whole table, optionally filtering the items returned. For example, the data storage service (and/or underlying system) described herein may provide various data plane APIs for performing item-level operations, such as a PutItem API, a GetItem (or GetItems) API, a DeleteItem API, and/or an UpdateItem API, as well as one or more index-based seek/traversal operations across multiple items in a table, such as a Query API and/or a Scan API.

Figure 4:
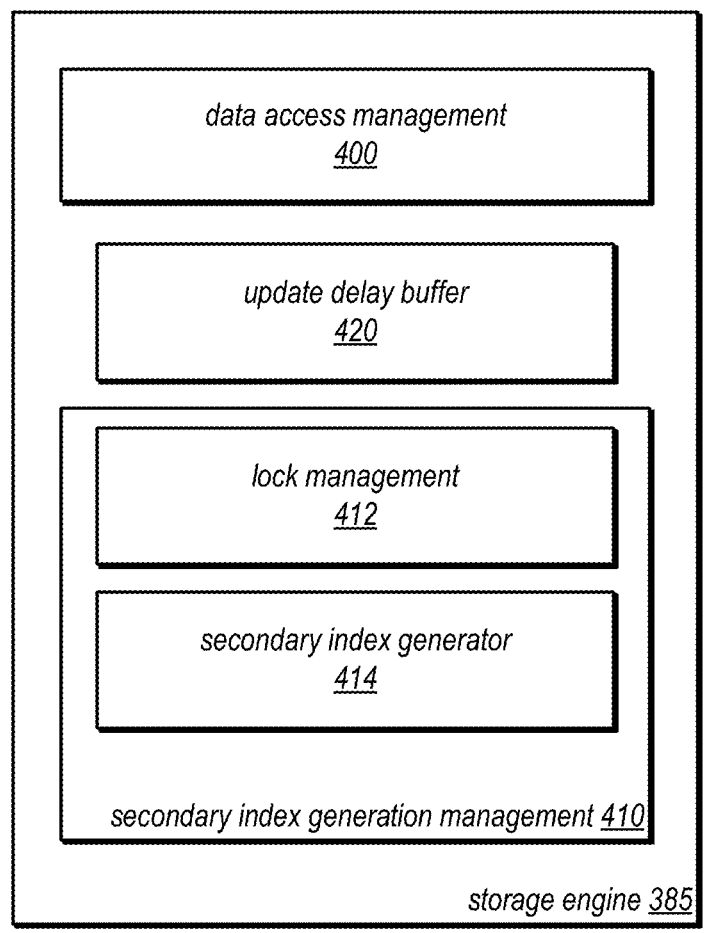
FIG. 4 is a logical block diagram illustrating an example storage engine that implements locking item ranges for creating a secondary index from an online table, according to some embodiments.

FIG. 4 is a logical block diagram illustrating an example storage engine that implements locking item ranges for creating a secondary index from an online table, according to some embodiments. Storage engine 385 may be configured to perform locking item ranges for creating a secondary index from an online table, as described above with regard to FIG. 1 and below with regard to FIGS. 5 and 6. Storage engine 385 may implement data access management 400 to process access requests directed to items in table stored at a storage node. For example, data access management 400 may be configured to identify read or get requests for items, which do not modify items, add items, remove items or other otherwise update a table. Access management 400 may allow these read or get requests to proceed regardless of whether or not the items are within a range of locked items. For write, put, or other requests that modify, add, remove, or otherwise update the table (e.g., data values for attributes of items), data access management 400 may be configured to restrict access to update requests that are not included within a locked range of items. Data access management 400 may utilize range identifiers or other metadata which indicates the boundaries of lock ranges (which lock management 414 may update to lock and unlock items). In some embodiments, storage engine 385 may implement update delay buffer 420 which may store requests that update the table within a locked range of items (e.g., as a queue or other data structure which may store data to perform the requested updated at a later time). When the range of items is unlocked, data access management 400 may access the update delay buffer 420 and perform the stored updates. In some embodiments, if data access management determines that update delay buffer does not have available space to store the request, then the update request may be denied. In some embodiments, other or additional resources for delaying the update request may be utilized. For instance, a processing thread that handles a particular update request that is within a locked range of items may block for a period of time (e.g., 50 milliseconds) after which it may determine again whether the update the range is still locked. If the range is not still locked, then the update may be performed. In at least some embodiments, a processing thread may block for a period after determining that update delay buffer 420 has no available storage space to store an update request.

Storage engine 385 may implement secondary index generation management 410 to generate a secondary index from items of a table stored by a storage node. Lock management 412 may, for instance, identify an index scheme for the secondary index (e.g., an attribute from the table to be a hash key value, and possibly another attribute rom the table to be a range key value). The index scheme may be provided or indicated, in some embodiments, in a request to generate the secondary index received from a client.

Lock management 412 evaluate items of the table and determine a range of items to lock. The range of items to lock may, in some embodiments, may be determined according to the order in which items may be stored to the secondary index. For instance, if items are to be sorted by an attribute value of age and then stored by income, then a range of items may be determined from the first value and a range of income values (e.g., lock items from age 18 income $0 to age 18 income $25,000). In at least some embodiments the size of the range may be determined. For instance, if the access request load directed to the table is light, then a larger size may be determined for the range lock, whereas if the access request load is heavy, then a smaller size of the range may be determined. Range size may be determined from one range lock to the next, in some embodiments. While in other embodiments, the range lock may remain fixed for the duration of the generation of the secondary index. In at least some embodiments, a client may request a size of the range (e.g., when requesting the creation of the secondary index).

Lock management 412 may update data access management 400 in order to ensure that items within the range are locked for update access and provide the locked range to secondary index generator 414 to begin reading the items within the locked range and generating corresponding items in the secondary index according to the index schema. Once secondary index generator 414 has evaluated all items in the locked range, lock management 412 may be notified in order to unlock the range of items and determine whether another range of items should be locked. Lock management 412 may track which ranges of items have been locked so that secondary index generation continues until each item has been included in a locked range and evaluated for secondary index generation.

As noted earlier, a table may be partitioned amongst multiple storage nodes, therefore other secondary index generation management at other storage nodes may perform similar techniques to those described above and below. For instance, for a table partitioned amongst 5 different storage nodes (or 5 different replica groups of storage nodes), the respective storage engines of the storage nodes may manage the generation of a portion of a secondary index for the table corresponding to the items stored at the respective storage node.

Figure 5:
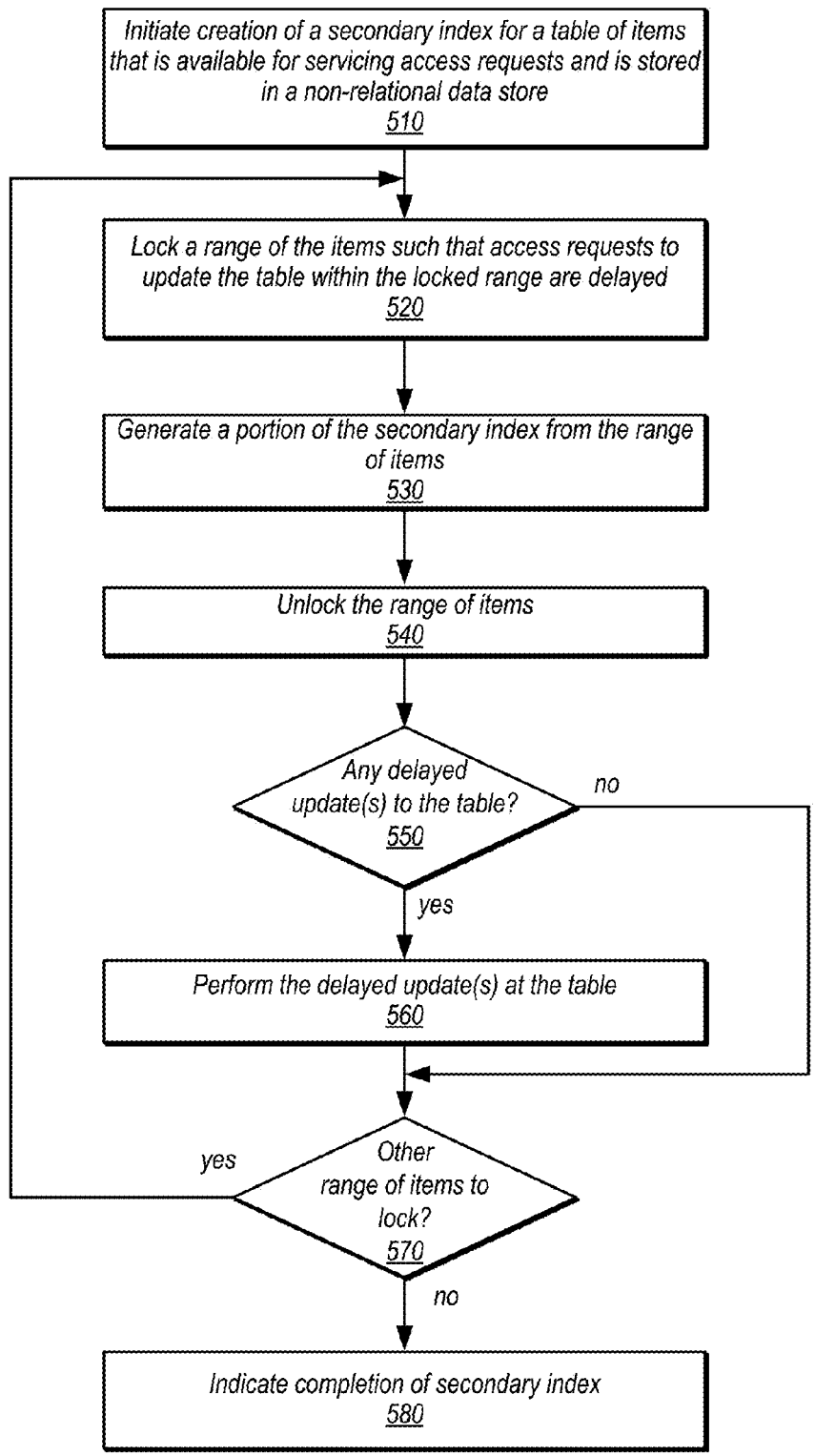
FIG. 5 is a high-level flowchart illustrating various methods and techniques to implement locking item ranges for creating a secondary index from an online table, according to some embodiments.

The examples of locking item ranges for creating a secondary index from a table in a non-relational data store in FIGS. 2-4 have been given in regard to a non-relational database service. However, various other types of non-relational data stores that may provide online generation of a secondary index may implement locking item ranges for creating a secondary index from a table in a non-relational data store. FIG. 5 is a high-level flowchart illustrating various methods and techniques to identify and perform asynchronous processing for requests directed to a network-based data store, according to some embodiments. These techniques may be implemented using one or storage nodes as described above with regard to FIGS. 2-4, as well as other databases and/or different implementations of a client and/or storage engine, and thus the following discussion is not intended to be limiting as to the other types or configurations of non-relational data stores that may implement the described techniques.

As indicated at 510, creation of a secondary index for a table of items stored in a non-relational data store may be initiated. Creation of a secondary index may be initiated as a result of a request to create the secondary index, which may identify an indexing schema for items in the secondary index. For example, the request may indicate two different attributes to be utilized for indexing items in the secondary index as a hash key and a range key, or a single attribute as the hash key. Other attributes to be included in the secondary index in addition to the hash and/or range key may be specified.

While the secondary index is being generated the table may be online or otherwise available for servicing access requests. For instance, various types of requests to change, modify, update, get, read, put, write or otherwise interact with items may be received. As indicated at 520, a range of the items in a table may be locked such that access requests to update a portion of the locked table may be delayed. For instance, an access control, such as access management 400 in FIG. 4, that receives access requests for the table and evaluates the access requests may be updated to include range identifiers (e.g., attribute values which identify the boundaries of the locked range) to determine whether or not an access request is within the range of items. Those access requests that access data in an item in the locked range of items may be delayed. Delayed requests may be stored in a buffer (as discussed above with regard to FIGS. 1 and 4, and below with regard to FIG. 6), denied with an instruction to retry, or otherwise blocked from completing (e.g., a processing thread handling the request sleeps for a period of time before checking to see whether the range of items is still locked and performing the update).

As indicated at 530, a portion of the secondary index may be generated from the range of locked items, in various embodiments. For example, the attribute value(s) of items in the range may be evaluated with respect to the index schema identified for the secondary index. Consider the scenario where a hash key may be identified as a gender attribute for items and the range key identified as an age attribute. The evaluation may copy the gender attributes from the items, sort the items by gender, and then store each gender in age order as items in the secondary index. A primary key value may also be included (e.g., a unique user identifier) in the new item, in various embodiments. If any other attributes are specified to be included in the secondary index those attribute values may also be stored with the gender, age, and primary key values.

Once the generation of the portion of the secondary index from the range of items is complete, the range of items may be unlocked, as indicated at 540. For instance, the access control mechanism may be modified to remove the lock that delays updates to the table within the range identifiers by removing the range identifiers from a set of metadata describing active range locks. If any update(s) were delayed for the table during the time that the table was locked, as indicated at 550, then the delayed update(s) may be performed at the table. For instance, the write request to modify an attribute value may be performed. In some embodiments, an update may be performed at the secondary index. Consider, for instance, an index schema for the secondary index that includes an additional attribute to be stored, along index attribute values. If an update is performed at the table that changes the value of this additional attribute, then the corresponding item in the secondary index may be updated to change the value of the additional attribute in the secondary index.

As indicated at 570, there may be another range of items to lock in order to complete generation of the secondary index. For example, the secondary index may be incrementally generated by successively locking ranges of items in the table according to the index schema. Consider an index schema that orders items according to last name, then first name alphabetically. The first range of items locked may be items with last name attribute values within the range of "A" to "C." After an initial performance of elements 520-560 for the range of "A" to "C" a next range of "D" to "G" may be performed. This may continue until "Z" has been included in a locked range, after which, as indicated at 580, an indication may be provided that generation of the secondary index is complete. In some scenarios, the selection and locking of a next range of items may be delayed in order to throttle performance of generating the secondary index or to allow a received update request that is within a range of items to be locked time to complete before locking the range of items.

Figure 6:
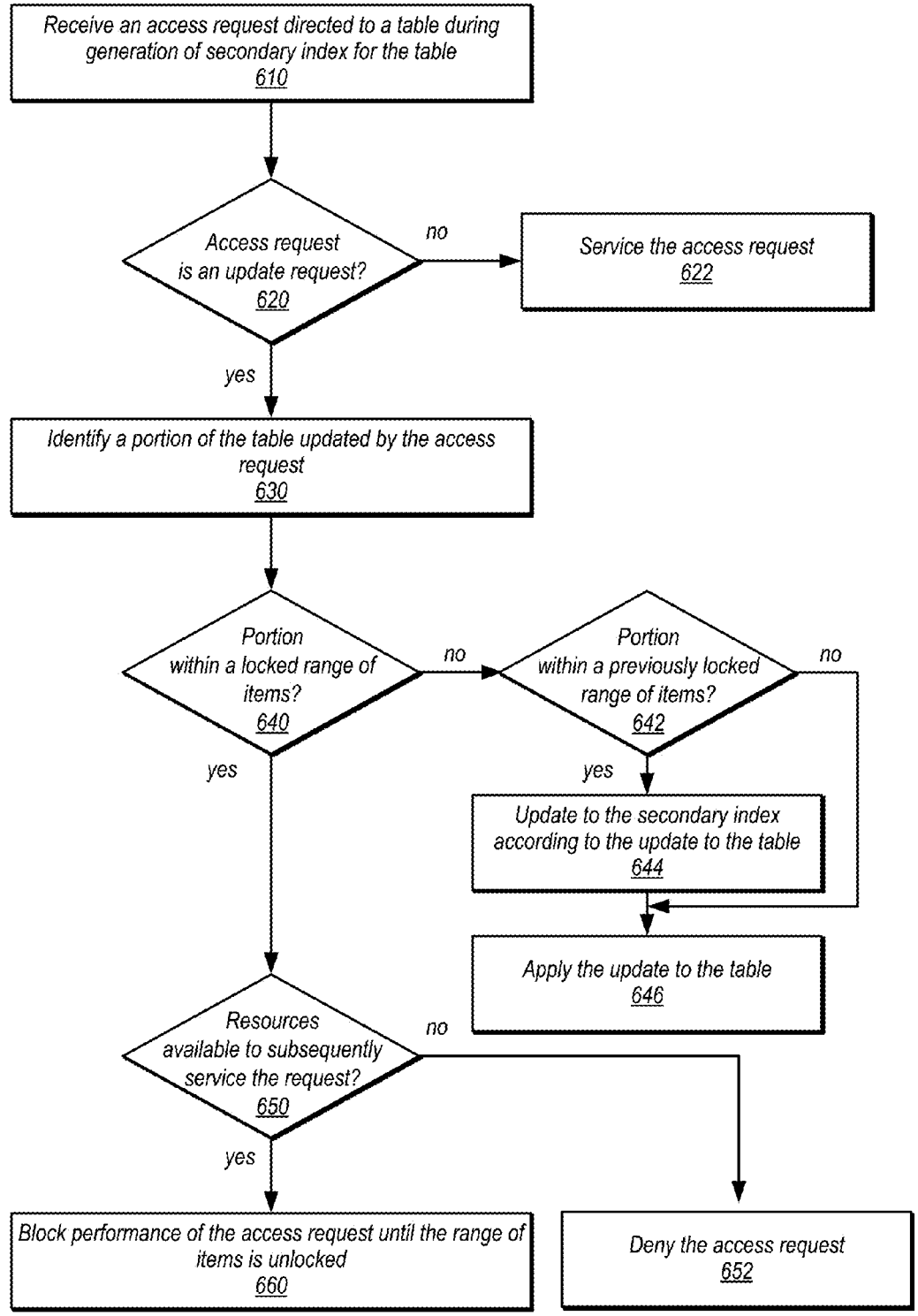
FIG. 6 is a high-level flowchart illustrating various methods and techniques to process access requests for a table undergoing creation of a secondary index, according to some embodiments.

As noted above, while a secondary index is being created for a table, the table may still be available to process access requests. With multiple types of access requests and differing impacts those types of requests may have upon the operation of creating a secondary index, the processing of requests may be handled differently, in some scenarios. FIG. 6 is a high-level flowchart illustrating various methods and techniques to process access requests for a table undergoing creation of a secondary index, according to some embodiments.

As indicated at 610, an access request may be received that is directed to a table during creation of a secondary index for the table. Access requests may be received via a network-based interface for a non-relational data store hosting the table. A network-based interface for the non-relational data store may be programmatic (e.g., an API), allowing clients to format requests so as to provide the non-relational data store with enough information to process the request. For example, various requests to change, modify, update, get, read, put, write or otherwise interact with data may be specified according to the API. For some access requests that do not change or modify the data, the impact of servicing the request upon generating the secondary index may be minimal, and therefore the request may be serviced. As indicated at 620, for example, if the access request is not an update request, then request may be serviced, as indicated at 622. A get or read request for data may be received which does not modify data in the table being indexed as part of generating the secondary index. Thus, the get or read request may be serviced (e.g., by obtaining the requested data and sending the requested data in response).

Some access requests, however, may have greater impact upon secondary index creation. Thus further evaluation of the access request may be performed before determining whether to service the request. As indicated by the negative exit from 620, an update request may be evaluated to identify a portion of the table updated by the access request, as indicated at 630. Requests may include, for instance, an item name, key, attribute, or other identifier which indicates an item to be accessed. The portion of the table updated by the access request may include one or multiple items.

A determination may be made as to whether the identified portion of the table is within a locked range of items, as indicated at 640. A locked range of items may be defined in various ways, as noted above. For instance, the range of items may be identified according to an attribute, key, identifier or other data stored as part of the item. If a numeric key is used, for example, a range of items may be defined as range of key values (e.g., 10-15). To determine whether the identified portion of the table is within a locked range of items, the identified portion may be compared with respect to the locked range of items (e.g., key value of 12 is within the range of 10-15, whereas a key value of 19 is not). In some embodiments, the update request may be a request to put or insert a new item into the table which may also be within a locked range of items. For example, if the update request puts a new item in the table that is being indexed according to last name (e.g., "Smith"), then for a range of locked items identified as last names between "Si" to "Sn," the item would be within the range of locked items if it were put in the table.

For those requests to update a portion within a locked range of items, as indicated by the positive exit from 640, performance of the access request may be blocked until the range of items is unlocked, as indicated at 660. A check may be performed, as indicated at 650, to determine whether any resources are available to subsequently service, the request. For instance, a determination may be made as to whether any space to store the access request is available in an update delay buffer. In another example, a determination may be made as to whether a processing thread is available to handle the request (e.g., a scenario where not all of the request handling threads are blocking for previously received update requests). If resources are not available, the access request may be denied, as indicated at 652. For instance a response may be sent to a client indicating an error code (e.g., HTTP error code 500 indicating server error).

For those requests to update a portion of the table that are not within a locked range of items, as indicated by the negative exit from 640, a determination may be made as to whether the portion is within a previously locked range of items, as indicated at 640. For instance, consider the range of last name values given above. If the request to put the new item includes a value of "Doe" for the last name, then "Doe" might be in a previously locked range of "De" to "Fa." For portions within a previously locked range (which has already been indexed to create the secondary index), the secondary index may be updated according to the received update (e.g., adding the new item if appropriate), as indicated 644. Then the update may be applied to the table, as indicated at 646 (e.g., inserting the item that includes the value "Doe"). If the portion is not within a previously locked range, then the update may be applied, as indicated at 646, without updating the secondary index, as indicated by the negative exit from 642. Note that in some embodiments, already created secondary index(es) may exist for the table in addition to the secondary index being created. In such a case, the update may be made to the other secondary index(es) as described according to 644.

The methods described herein may in various embodiments be implemented by any combination of hardware and software. For example, in one embodiment, the methods may be implemented by a computer system (e.g., a computer system as in FIG. 7) that includes one or more processors executing program instructions stored on a computer-readable storage medium coupled to the processors. The program instructions may be configured to implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Figure 7:
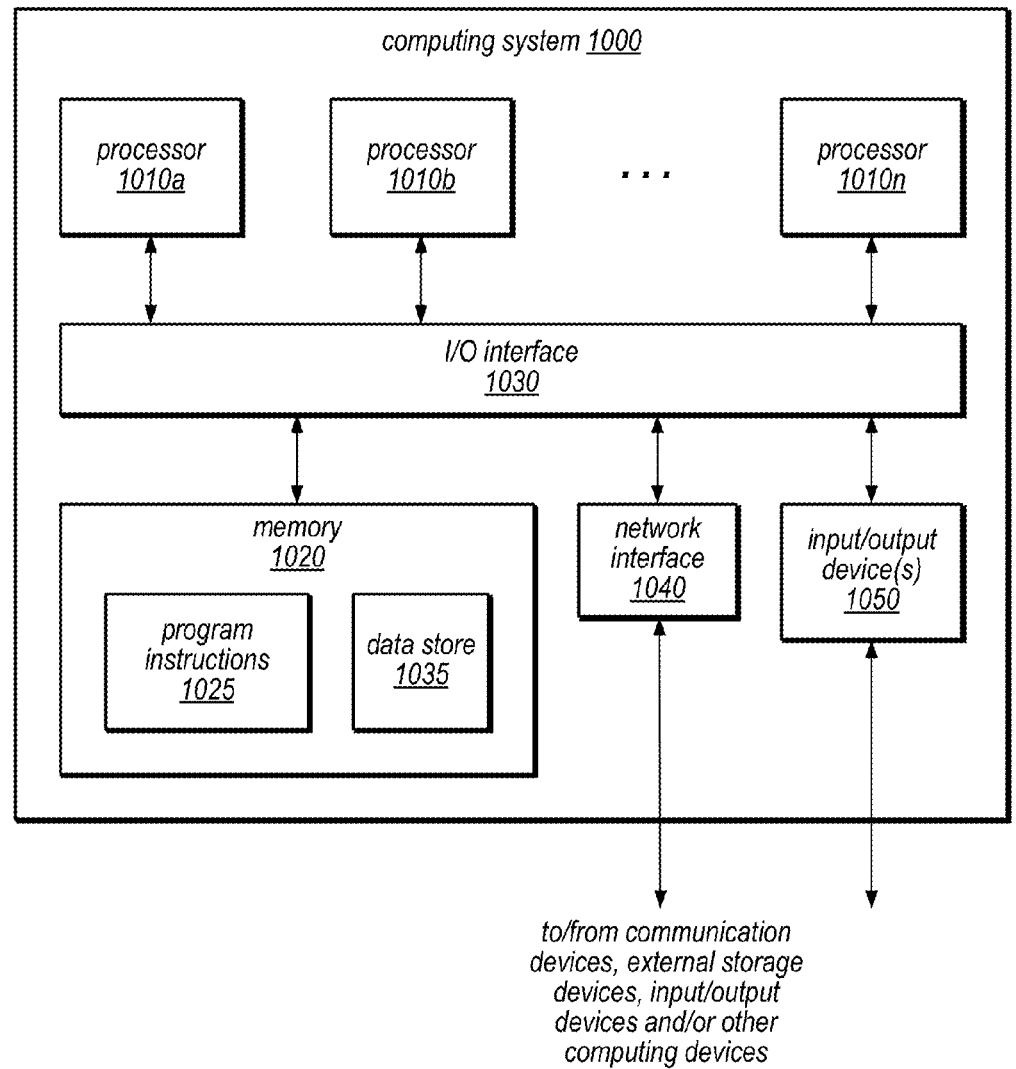
FIG. 7 is a block diagram illustrating an example computing system, according to some embodiments.

Embodiments of locking items ranges for creating a secondary index from an online table as described herein may be executed on one or more computer systems, which may interact with various other devices. One such computer system is illustrated by FIG. 7. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device, keyboard, and display(s). Display(s) may include standard computer monitor(s) and/or other display systems, technologies or devices. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s).

System memory 1020 may be configured to store program instructions 1025 and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 7, memory 1020 may include program instructions 1025, configured to implement the various embodiments of the systems as described herein, and data store 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 1000 may be transmitted to computer system 1000 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A non-relational data store, comprising:
   one or more computing devices that implement a storage node for the non-relational data store;
   the storage node, configured to:
      create a secondary index for a table that includes a plurality of items stored at the storage node, wherein the table is available for servicing access requests received during the creation of the secondary index, wherein to create the secondary index the storage engine is configured to:
         lock a range of the items such that access requests to update a portion of the table included in the range are not completed while the range is locked;
         generate a portion of the secondary index from the range of items; and
         upon completion of the generation, unlock the range of the items;
         wherein the lock, the generation, and the unlock are performed for different ranges of the items until the secondary index is complete, wherein a request to update the table directed to at least one of the different ranges that is received while the at least one range is locked is performed subsequent to the unlock of the at least one range.

2. The non-relational data store of claim 1, wherein the storage node is further configured to:
   receive another request to update the table during the creation of the secondary index;
   identify a portion of the table updated according to the other request; and
   in response to a determination that the portion of the table updated according to the other request is not within a locked range, perform the update to the portion of the table according to the other request.

3. The non-relational data store of claim 1, wherein the storage node is further configured to:
   store the request to update the table directed to at least one range in a buffer;
   upon the unlock of the at least one range:
      access the buffer to retrieve the request; and
      perform the request to update the table.

4. The non-relational data store of claim 1, wherein the non-relational data store is a network-based storage service, wherein the storage node is one of a plurality of storage nodes that store different partitions of the table, wherein other ones of the plurality of storage nodes perform the creation of the secondary index for the partitions stored at the other storage nodes.

5. A method, comprising:
   performing, by one or more computing devices:
      generating a secondary index for a table that includes a plurality of items stored in a non-relational data store, wherein the table is available for servicing access requests during the creation of the secondary index, wherein the generating comprises locking different ranges of the items until corresponding portions of the secondary index generated from the different ranges of items are complete;
      during the generating of the secondary index:
         receiving a request to update the table;

determining that the update to the table is within one of the different ranges of the items locked for creating the secondary index;
delaying the request for subsequent performance; and
upon unlocking the one range of items, updating the table in accordance with the stored request.

6. The method of claim 5, further comprising:
during the generating of the secondary index:
receiving another request to update the table;
identifying a portion of the table updated according to the other request; and
determining that the portion of the table updated according to the other request is not within a locked range;
in response to determining that the portion of the table updated according to the other request is not within the locked range, performing the update to the portion of the table according to the other request.

7. The method of claim 6, further comprising:
determining that the portion of the table is within a previously locked range of the items; and
in response to determining that the portion of the table is within the previously locked range, updating the secondary index according to the other request.

8. The method of claim 6, wherein the portion of the table is within a range of items to be locked, and wherein the method further comprises blocking a lock on the range of items to be locked until the other request is performed.

9. The method of claim 5, wherein the update to the table is a modification to an item within the one locked range.

10. The method of claim 5, wherein delaying the request comprises storing the request in a buffer of received requests to update the table.

11. The method of claim 5, further comprising:
during the generating of the secondary index:
receiving another request to update the table, wherein the update to the table of the other request is within the one locked range;
determining that resources are not available to subsequently service the other request; and
in response to determining that the resources are not available, denying the other request to update the table.

12. The method of claim 5, further comprising:
prior to locking at least one of the different ranges of items, determining a size of the at least one range.

13. The method of claim 5, wherein the table is stored across a plurality of partitions in the non-relational data store, wherein the generating, the receiving, the determining, the delaying, and the unlocking are performed at different ones of the partitions.

14. A system, comprising:
one or more storage devices that store data for a non-relational data store;
at least one processor;
a memory that comprises program instructions, wherein the program instructions cause the at least one processor to implement a storage engine for a non-relational data store;
the storage engine, configured to:
generate a secondary index for a table that includes a plurality of items stored in a non-relational data store, wherein the table is available for servicing access requests during the generation of the secondary index, wherein to create the secondary index, the storage engine is configured to lock different ranges of the items until corresponding portions of the secondary index generated from the different ranges of items are complete;
during the generation of the secondary index:
receive a request to update the table;
determine that the update to the table is within one of the different ranges of the items locked for creating the secondary index;
store the request for subsequent performance; and
upon unlock of the range of items, update the table in accordance with the request.

15. The system of claim 14, wherein the storage engine is further configured to:
during the generation of the secondary index:
receive another request to update the table;
identify a portion of the table updated according to the other request; and
determine that the portion of the table updated according to the other request is not within a locked range;
in response to the determination that the portion of the table updated according to the other request is not within the locked range, perform the update to the portion of the table according to the other request.

16. The system of claim 15, wherein the portion of the table is within a range of items to be locked, and wherein the method further comprises updating another secondary index maintained for the table according to the other request.

17. The system of claim 14, wherein the request to update the table is a request to add a new item to the table, wherein the new item would be within the one range of items that is locked.

18. The system of claim 14, wherein the storage engine is further configured to:
during the generation of the secondary index:
receive request to read data from one or more items within the one range of items that is locked;
send the data from the one or more items in response to the request.

19. The system of claim 14, wherein the request is stored in a buffer of received requests, and wherein the storage engine is further configured to:
receive another request to update the table, wherein the update to the table of the other request is within the one locked range;
determine that the resources are not available to subsequently service other request; and
in response to the determination that the resources are not available, deny the other request to update the table.

20. The system of claim 14, wherein the storage engine is implemented as part of a storage node for the non-relational data store, wherein the system further comprises a plurality of storage nodes including the storage node, wherein the table is stored in a plurality of partitions at different storage nodes, and wherein the non-relational data store is a network-based storage service that stores the table for a client of the network-based storage service.

* * * * *